United States Patent [19]

Roberts

[11] 4,109,939

[45] Aug. 29, 1978

[54] DEVICE FOR ATTACHING A FLUID CARRYING HOSE TO A RECEPTACLE DRAIN

[76] Inventor: Richard Steven Roberts, 1039-66th St., Brooklyn, N.Y. 11219

[21] Appl. No.: 690,966

[22] Filed: May 28, 1976

[51] Int. Cl.² .............................................. F16L 55/00
[52] U.S. Cl. .......................................... 285/8; 4/288; 285/177; 285/252; 285/404
[58] Field of Search ................... 285/177, 252, 404, 8, 285/42, 191, 9 R; 4/286, 287, 288, 190, 295, 256, 292, 290, 291, 204, 206, 198; 138/90; 137/562; 210/801, 163-166; 68/208

[56] References Cited

U.S. PATENT DOCUMENTS

| 601,360 | 3/1898 | Swift | 4/256 |
|---|---|---|---|
| 964,954 | 7/1910 | Coles | 4/288 |
| 1,228,320 | 5/1917 | Guillot | 285/8 |
| 2,274,453 | 2/1942 | Matter | 285/8 X |
| 2,681,816 | 6/1954 | Smith | 285/177 |
| 2,749,999 | 6/1956 | Schmid | 285/404 X |
| 3,355,750 | 12/1967 | Wisdom | 68/208 X |

FOREIGN PATENT DOCUMENTS

| 1,251,111 | 9/1967 | Fed. Rep. of Germany | 285/177 |
|---|---|---|---|
| 275,353 | 8/1951 | Switzerland | 4/288 |
| 105,535 | 4/1917 | United Kingdom | 4/286 |
| 751,471 | 6/1956 | United Kingdom | 4/287 |

*Primary Examiner*—Dave W. Arola
*Attorney, Agent, or Firm*—Richard S. Roberts

[57] ABSTRACT

A device for fixing a fluid carrying hose to the drain of a sink receptacle. Principally applied to attaching a household washing machine waste water escape hose directly to the drain of a typical sink, thus preventing a fluid surge from dislodging the hose from the sink and causing subsequent damage. The device comprises a cuplike frame having a central pipe portion; means for attaching a fluid carrying hose to the central pipe portion; and means for removably attaching the frame to the walls of a sink drain.

5 Claims, 5 Drawing Figures

U.S. Patent  Aug. 29, 1978  Sheet 1 of 2  4,109,939
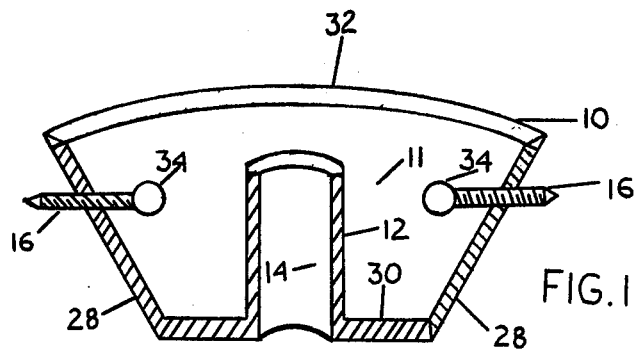
FIG. 1
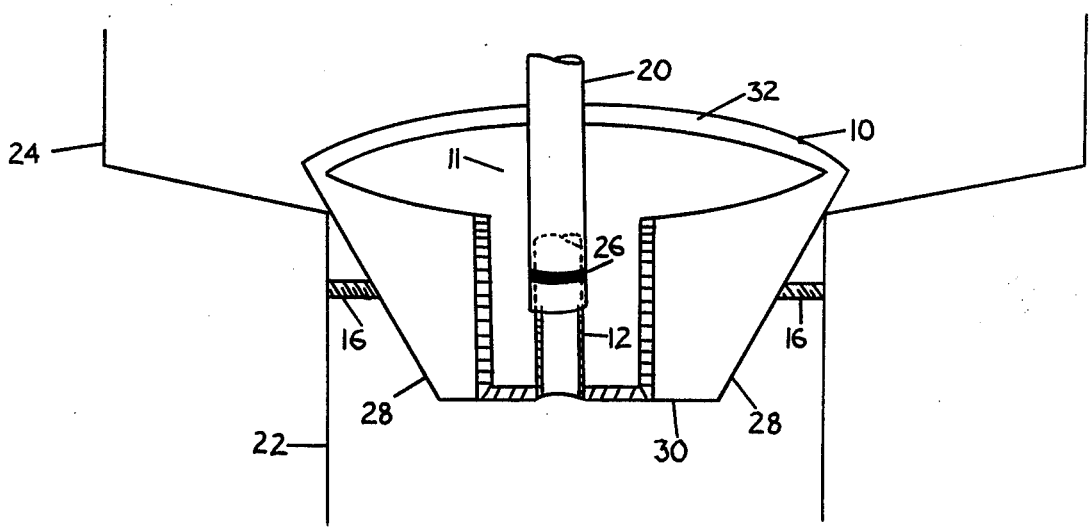
FIG. 2
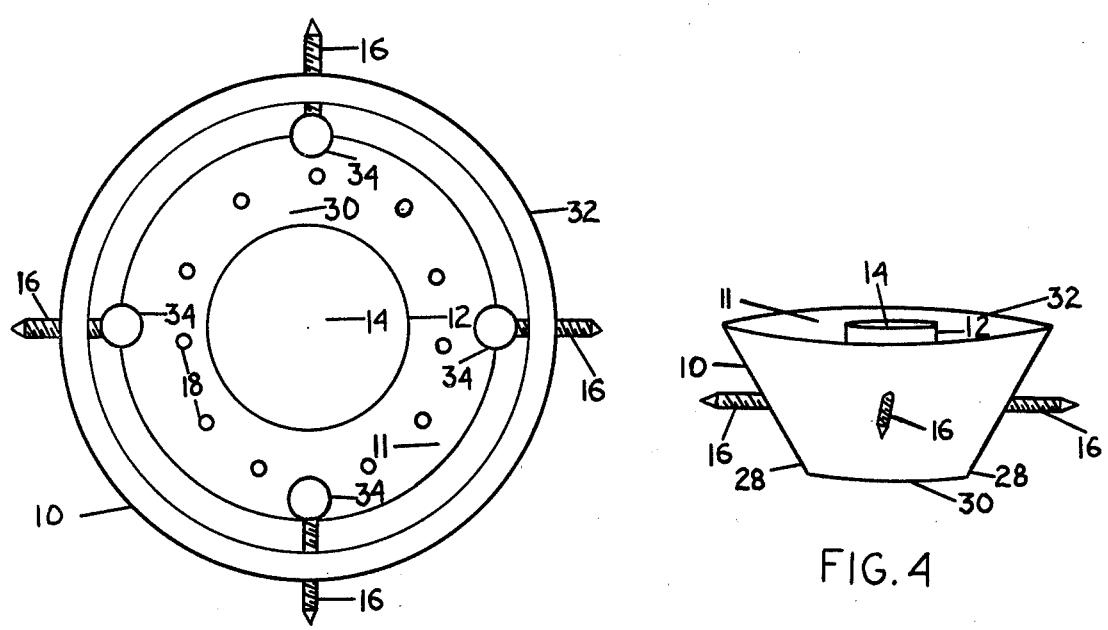
FIG. 3
FIG. 4

DEVICE FOR ATTACHING A FLUID CARRYING HOSE TO A RECEPTACLE DRAIN

BACKGROUND OF THE INVENTION

The present invention relates to a device for attaching a waste water escape hose from a household washing machine to the drain hole of a sink.

Heretofore it has been a necessary practice to simply drape or hook a washer waste water escape hose over the lip of a sink basin, and allow waste water to fall into the basin and subsequently seep into the drain passageway. This practice has caused a serious problem since the surge of fluid has often caused the escape hose to become dislodged from its support at the lip of the sink basin and resulted in flood damage to the surrounding room.

This previously unresolved problem is overcome by the present invention whereby the fluid carrying hose is securely clamped to the sink drain allowing fluid to flow directly to the drain hole, and preventing the hose from becoming dislodged with resulting damage.

SUMMARY OF THE INVENTION

Consequently, it is an object of the present invention to provide a device for attaching a fluid carrying hose directly to the drain of a typical sink receptacle.

It is another object of the invention to provide a device for fixing a fluid carrying hose to a sink drain which is economical to manufacture and is simple in construction.

It is a further object of the invention to provide a device for fixing a fluid carrying hose to a sink drain which is easy to attach to and remove from a sink drain as required.

It is a still further object of the invention to provide a device for fixing a fluid carrying hose to a sink drain which is adjustable to different size hoses and sink drains.

Another object of the invention is to provide a device for fixing a fluid carrying hose to a sink drain which also permits alternate access to the drain facility.

It is still another object of the invention to provide a device for fixing a fluid carrying hose to a receptacle drain which is also applicable to various other industrial, commercial and household uses.

To achieve the above objects the present invention comprises a cuplike frame having a hollow pipe portion in its floor; means for attaching a fluid carrying hose to the pipe portion; and means for fixing the frame to the sink drain.

According to the presently preferred embodiment the cup-like frame is set within the sink drain and rigidly retained therein by means provided. The fluid carrying hose is fixedly attached to the pipe portion. Fluid flows from the hose through the provided pipe portion and passes to the sink drain. The force caused by the flowing fluid is resisted, thereby preventing unwanted spillage and damage.

BRIEF DESCRIPTION OF THE DRAWINGS

FIG. 1 is a front sectional view of the device for fixing a fluid carrying hose to a sink drain.

FIG. 2 is a partial front sectional/perspective view of the device shown set in place in a sink drain, and attached to a fluid carrying hose.

FIG. 3 is a plan view of the device.

FIG. 4 is a perspective view of the device.

DETAILED DESCRIPTION OF THE PREFERRED EMBODIMENT

Figure 5:
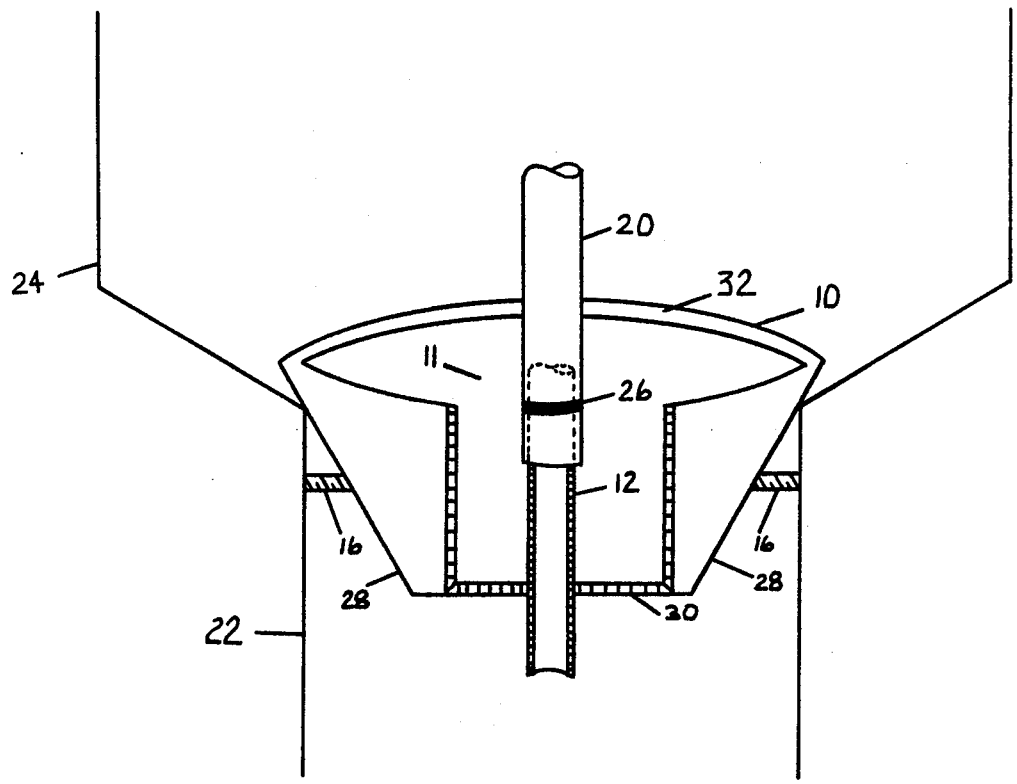
FIG. 5 is a partial front sectional/perspective view of the device, shown set in place in a sink drain and attached to a fluid carrying hose specifically showing the pipe portion extending beneath the floor level of the frame.

Referring now to the drawings, the device for fastening a fluid carrying hose to the drain hole of a sink receptacle is shown to comprise a cup 10 having a cavity 11, a plurality of draining holes 18, and a hollow pipe portion 12 concentric to the cup through its floor 30; means 16 for fastening cup 10 to the subject sink drain 22; and means 26 for attaching a fluid carrying hose 20 to pipe portion 12.

All parts are preferrably composed of a rigid, durable material such as aluminum, stainless steel or firm plastic, although any other suitable material having similar characteristics may be employed.

The cup is preferably constructed with a mouth 32 whose diameter is greater than that of the sink drain, a floor 30 whose diameter is smaller than that of the sink drain and inwardly sloping sides 28. In use the device is inserted into the sink drain and does not fall down the drain pipe 22, but is held in place at a level determined by the diameter of the particular drain. The floor of the cup 30 has a plurality of drain holes 18 so that a sink user may also expel fluid down the drain while the device is set in place.

Pipe portion 12 has a concentric passageway 14 and in use is set within the central cavity of the subject escape hose 20. Fluid is free to flow from the escape hose 20, through pipe portion 12 and released to sink drain 22. Hose 20 is fixedly held around pipe portion 12 by suitable retaining means 26 which in the preferred embodiment is a commonly available band type clamp which is well known in the prior art and is not a point of novelty in this application. A suitable adhesive bond may also be employed.

Cup 10 is removably affixed to drain 22 by suitable fastening means which in the preferred embodiment consists of a plurality of screws which pass through holes in the sides of the cup and form a frictional adhesion with the sides of the drain when sufficiently tightened. This adhesion is of such a strength as to prevent the hose and device combination from coming ajar while fluid is flowing.

In the preferred embodiment the heads 34 of screws 16 are of such a nature as to allow manual tightening and loosening without necessitating the use of tools.

In use the fluid carrying hose 20 is permanently attached around pipe portion 12. The combination hose and retaining device is then inserted through the sink drain as required. Fastening screws 16 are subsequently tightened to retain the combination fixedly in drain 22 for use as fluid passes from hose 20 through passageway 14 to drain 22. While the device is fixed in place, the service of the drain is also available by means of drain holes 18 in the cup floor. When use is complete, screws 16 are loosened and the hose and device combination removed and stored.

It is understood that changes in the structure, materials and operating conditions of the device are possible by those skilled in the art without departing from the nature and principles of the invention. The presently disclosed embodiment is employed for the purpose of illustration only and does not intend to limit the scope of the invention.

It is further understood that the present invention is not limited to use with waste water escape hoses from household washing machines but may also be utilized in other fluid flow applications such as those typical to household, industrial and commercial processes.

I claim:

1. A device for retaining and fixing a fluid carrying hose to the drain of a sink receptacle which comprises:
   (a) a cup shaped frame having side walls and a floor connected thereto, a plurality of drain holes in the floor, a hollow pipe portion through the floor; and
   (b) a plurality of manually turnable screws for holding said frame in said drain which protrude through holes in the frame side walls and are capable of forming a frictional adhesion with the inside of the sink drain walls; and
   (c) an adjustable band clamp capable of fixing a fluid carrying hose around the pipe portion.

2. A drainage device for washing machines and the like interconnectable between the waste water outlet of a washing machine and a smooth drain of a drainage tub, said device comprising: a cup shaped frame having side walls and a floor connected thereto, a plurality of drainage holes and a hollow pipe portion through the floor, said floor being located at the lowermost level of the frame when said frame is set in an upright position, quick release retainer means for holding said frame in said drain and being mounted on the periphery of the side walls of said frame capable of forming a frictional adhesion with the inside walls of the drain of said drainage tub said pipe portion having a diameter substantially smaller than the diameter of said frame and being attached intermediate its ends perpendicularly to said floor, said pipe portion extending from said frame a sufficient distance above the floor to provide an attachment area for a drainage hose and a distance beneath said floor and means to secure said drainage hose to said pipe portion.

3. A device for fixing a smooth, unthreaded, fluid carrying hose to the mouth of a smooth, unthreaded receptacle drain which comprises a cup shaped frame having side walls and a floor connected thereto, a hollow pipe portion through the floor, a plurality of draining holes in the floor, quick release retainer means for holding said frame in said drain and being mounted on the periphery of the side walls of said frame capable of forming a frictional adhesion with the inside walls of said smooth, unthreaded receptacle drain and means fixing a fluid carrying hose around said hollow pipe portion.

4. A device according to claim 3 wherein the quick release retainer means comprises a plurality of screws which may be manually turnable and protrude through holes in the frame side walls and are capable of forming a frictional adhesion with the inside walls of the drain.

5. A device according to claim 3 where the means for fixing a fluid carrying hose around the hollow pipe portion is an adjustable band clamp.

* * * * *